United States Patent
Favrat et al.

(10) Patent No.: US 10,654,738 B2
(45) Date of Patent: May 19, 2020

(54) APPARATUS FOR SALT SEPARATION UNDER SUPERCRITICAL WATER CONDITIONS

(71) Applicant: ECOLE POLYTECHNIQUE FEDERALE DE LAUSANNE (EPFL), Lausanne (CH)

(72) Inventors: Daniel Favrat, Epalinges (CH); François Marechal, Orbe (CH); Alberto Mian, Blonay (CH); Adriano Viana Ensinas, São Paulo (BR)

(73) Assignee: Ecole Polytechnique Foderale De Lausanne (EPFL), Lausanne (CH)

( * ) Notice: Subject to any disclaimer, the term of this patent is extended or adjusted under 35 U.S.C. 154(b) by 0 days.

(21) Appl. No.: 15/543,864

(22) PCT Filed: Jan. 13, 2016

(86) PCT No.: PCT/IB2016/050146
§ 371 (c)(1),
(2) Date: Jul. 14, 2017

(87) PCT Pub. No.: WO2016/113685
PCT Pub. Date: Jul. 21, 2016

(65) Prior Publication Data
US 2018/0009692 A1    Jan. 11, 2018

(30) Foreign Application Priority Data
Jan. 16, 2015   (EP) ..................... 15151416

(51) Int. Cl.
*C02F 11/08* (2006.01)
*B01J 3/00* (2006.01)
(Continued)

(52) U.S. Cl.
CPC ............. *C02F 11/086* (2013.01); *B01J 3/008* (2013.01); *C02F 1/38* (2013.01); *C02F 3/085* (2013.01); *Y02W 10/15* (2015.05)

(58) Field of Classification Search
None
See application file for complete search history.

(56) References Cited

U.S. PATENT DOCUMENTS 3,888,733 A * 6/1975 Grimmett ................ G21C 1/26
                                                    376/174
4,714,591 A    12/1987 Avedesian
(Continued)

FOREIGN PATENT DOCUMENTS

EP       3045433 A1 *  7/2016   ............ C02F 11/086
JP       2004131560      4/2004

OTHER PUBLICATIONS

International Search Report and Written Opinion issued by the International Searching Authority, dated Feb. 25, 2016, in related International Patent Application No. PCT/IB2016/050146; 13 pages.
(Continued)

*Primary Examiner* — Robert J Popovics
(74) *Attorney, Agent, or Firm* — Faegre Drinker Biddle & Reath LLP

(57) ABSTRACT

Apparatus for salt separation (2) under supercritical water conditions, comprising a heat exchanger (4) and a fluidized bed reactor (6). The fluidized bed reactor comprising a supercritical water pressure containing wall (8) defining therein a fluidized bed chamber (10) connected to an inlet system (16) at one end thereof and an outlet system (18) configured to separate solids from supercritical fluid at another end thereof. The fluidized bed chamber receives a fluidized bed (12) therein and is configured to receive through the inlet system (16) a liquefied aqueous substance (14) for treatment in the fluidized bed chamber. The inlet (Continued)

system (16) comprises an inlet chamber (20) and a fluidization plate (22) positioned between the inlet chamber (20) and the fluidized bed chamber (10). The fluidized bed chamber extends between the inlet system (16) and outlet system (18) and comprises an entry section (10a) adjacent the inlet system (16), an outlet section (10c) adjacent the outlet system (18), and a mid-section (10b) extending between the entry section and the outlet section. The heat exchanger (4) extends along the fluidized bed chamber (10) and is configured to generate a decreasing temperature gradient in the fluidized bed chamber from the outlet section (10c) to the entry section (10a), the temperature gradient in the outlet section and mid-section being supercritical for aqueous substances and being subcritical for aqueous substances in the entry section (10a) adjacent the fluidization plate (22).

9 Claims, 5 Drawing Sheets

(51) Int. Cl.
*C02F 1/38* (2006.01)
*C02F 3/08* (2006.01)

(56) References Cited

U.S. PATENT DOCUMENTS

| 4,822,497 | A | 4/1989 | Hong | |
| 5,543,057 | A | 8/1996 | Whiting | |
| 10,087,124 | B2 * | 10/2018 | Hong | B01J 8/1836 |
| 2002/0113024 | A1 | 8/2002 | Pilz | |
| 2013/0126442 | A1 | 5/2013 | Bakas | |
| 2014/0127786 | A1 * | 5/2014 | Iversen | C10G 1/02 435/252.1 |
| 2014/0298822 | A1 * | 10/2014 | Ma | F03G 6/067 60/783 |
| 2018/0009692 | A1 * | 1/2018 | Favrat | C02F 11/086 |
| 2018/0194701 | A1 * | 7/2018 | Hong | B01J 8/1836 |

OTHER PUBLICATIONS

"Simulation model of the mass balance in a supercritical circulating fluidized bed combustor", by Artur Blaszcuzuk et al., Powder Technology, Elsevier Sequoia, Lausanne, CH, vol. 246, dated Jun. 1, 2013; pp. 317-326.

* cited by examiner

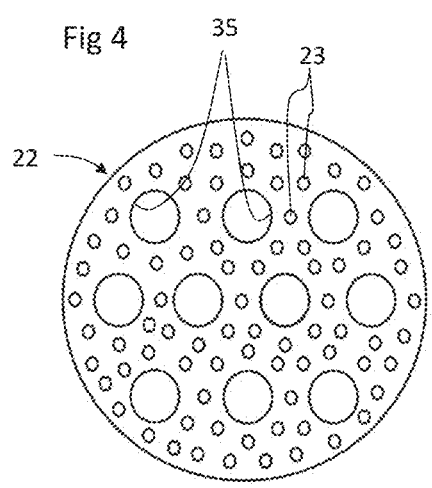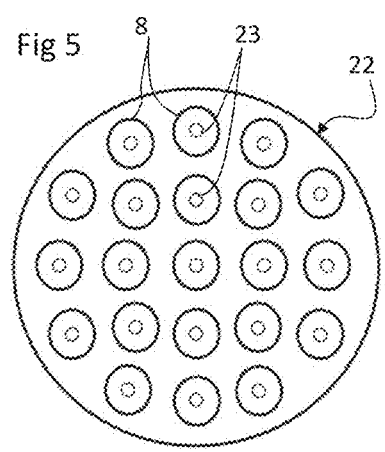

APPARATUS FOR SALT SEPARATION UNDER SUPERCRITICAL WATER CONDITIONS

This application claims priority to PCT application number PCT/IB2016/050146 filed Jan. 13, 2016, which in turn claims priority from EP Patent application number EP 15151416.3 filed Jan. 16, 2015, the subject matter of which are incorporated herein by reference.

FIELD OF THE INVENTION

This invention relates to an apparatus for salt separation under supercritical water conditions.

BACKGROUND OF THE INVENTION

It is known to use supercritical conditions for the treatment of organic waste in a water based liquid or liquefied substance in order to separate out solids and extract combustible gases, in particular methane. Such processes typically use an oxidising agent to oxidise the organic material under supercritical conditions, for instance as described in U.S. Pat. No. 4,822,497, U.S. Pat. No. 5,543,057 and JP2004131560. One of the known problems of known processes is the depositing of inorganic salts in the interior surface of the pressurized chamber in which the supercritical conditions are present. The use of a fluidized bed helps to reduce the deposits on the internal walls of the reaction chamber on the one hand by encouraging the deposit of salts on the grains of the fluidized bed and on the other hand by the abrasive effect on the grains against the internal wall of the reactor as described in U.S. Pat. No. 5,543,057.

In U.S. Pat. No. 5,543,057, as in other processes requiring an oxidizing reaction, a portion of the thermal energy contributing to the transformation from a subcritical to a supercritical condition is provided by the oxidation reaction. As the composition of the wet biomass may vary significantly, the control of this process may not always be optimal and thus the control of the transition from subcritical to supercritical temperatures may also not be well controlled. This can lead to unwanted deposits in portions of the reactor. Moreover, there are processes in which it is not desirable to have an oxidisation agent either for cost reasons, or because of the chemical properties of the water based solution to be treated.

In processes for the precipitation of solids in a fluidized bed reaction chamber, despite the presence of the fluidized bed with its abrasive effect to reduce deposits forming on the reaction chamber in a wall, certain portions in the reaction chamber may not be optimally circulated, thus allowing the deposit of salts on the walls, for instance at the inlet of the reaction chamber.

SUMMARY OF THE INVENTION

It is an object of the present invention to provide an apparatus for salt separation under supercritical water conditions that is efficient and economical, in particular that reduces the formation of deposits in the reactor chamber walls in a cost effective and easy to control process.

It is advantageous to provide an apparatus for salt separation in the supercritical conditions that can function efficiently in a continuous through flow process and that has a low maintenance down time of the apparatus.

It is advantageous to provide an apparatus for salt separation in supercritical conditions that can be easily scaled up as a function of the volume of aqueous based liquid to be treated.

It is advantageous to provide an apparatus for salt separation that can be employed with a large range of aqueous based liquids.

It is advantageous to provide an apparatus for salt separation under supercritical water conditions that is compact.

It is advantageous to provide an apparatus for salt separation under supercritical water conditions that is economical to manufacture.

It is advantageous to provide an apparatus for salt separation under supercritical water conditions that is robust and reliable.

Objects of this invention have been achieved by providing the according to claim 1.

Disclosed herein is an apparatus for salt separation under supercritical water conditions, comprising a heat exchanger and a fluidized bed reactor, the fluidized bed reactor comprising a supercritical water pressure containing wall defining therein a fluidized bed chamber connected to an inlet system at one end thereof and an outlet system configured to separate solids from supercritical fluid at another end thereof. The fluidized bed chamber receives a fluidized bed therein and is configured to receive a liquefied aqueous substance for treatment through the inlet system into the fluidized bed chamber. The inlet system comprises an inlet chamber and a fluidization plate positioned between the inlet chamber and the fluidized bed chamber. The fluidized bed chamber extends between the inlet system and outlet system and defines an entry section adjacent the inlet system, an outlet section adjacent the outlet system, and a mid-section extending between the entry section and the outlet section, wherein the heat exchanger is configured to generate a decreasing temperature gradient in the fluidized bed chamber from the outlet section to the entry section, the temperature gradient in the outlet section and mid-section being supercritical for aqueous substances and being subcritical for aqueous substances in at least a first portion of the entry section adjacent the fluidization plate.

In an embodiment, the heat exchanger may comprise a plurality of heat exchange elements positioned within the fluidized bed chamber in a distributed manner, the heat exchanger elements configured for receiving a heat exchange fluid therein and connected to a heat exchange fluid inlet positioned at a level of the outlet system of the fluidized bed reactor, the heat exchange system comprising a heat exchange fluid outlet at a level of the inlet system of the fluidized bed reactor.

In an embodiment, the heat exchange elements may comprise a plurality of tubular elements arranged in a spaced apart and distributed manner and extending from the heat exchange fluid inlet to the heat exchange fluid outlet.

In an embodiment, the heat exchanger comprises at least first and second heat exchange elements, the first heat exchange element being positioned in the entry section of the fluidized bed chamber and configured to heat the liquefied aqueous substance in the fluidized bed chamber at a temperature that remains subcritical adjacent the fluidization plate, the at least second heating element positioned in at least the mid-section and configured to heat the liquefied aqueous substance at a supercritical temperature.

A further heating element may be arranged in at least the outlet section of the fluidized bed chamber configured for maintaining the aqueous substance at a supercritical temperature.

In an embodiment, the fluidized bed reactor may comprise a plurality of reactor elements, each containing a fluidized bed chamber enclosed by a supercritical water pressure containing wall, the plurality of reactor elements with fluidized bed chambers being arranged in a distributed spaced apart manner and immersed in a heat exchanger chamber configured to receive a heat exchange fluid therein.

In an embodiment, the heat exchange chamber may comprises a heat exchange fluid inlet positioned at a level of the outlet system of the fluidized bed reactor, and a heat exchange fluid outlet at a level of the inlet system of the fluidized bed reactor.

In an embodiment, the heat exchange chamber may comprise one or more baffles configured to impart transverse flow to the heat exchange fluid across the plurality of fluidized bed chamber elements.

In an embodiment, the fluidized bed reactor is arranged such that inlet system is vertically lower than the outlet system configured such that gravitational force on grains of the fluidized bed pull the grains towards the fluidization plate against the flow of fluid in the fluidized bed chamber.

The apparatus for salt separation under supercritical water conditions according to the invention advantageously provides the heat for the separation with an integrated heat exchanger using an external heating media. The apparatus for salt separation under supercritical water conditions according to the invention advantageously combines subcritical and supercritical conditions in the fluidized bed in order to avoid deposits in pre-heating heat exchanger devices. Supplying heat from an external source by an integrated heat exchanger is advantageous in the case where the heat content of the organic matter oxidation is not sufficient to supply enough heat for reaching the supercritical conditions. This eliminates the need to use an oxidant flow or additional fuel in the reactor (other than the oxygen already present in the subcritical fluid flow compounds). Avoiding the use of an oxidant allows operating in a less aggressive environment for the reactor materials.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which:

FIG. 4 is a schematic view of a fluidization plate according to an embodiment for the apparatus of FIG. 1;

FIG. 5 is a schematic view of a fluidization plate according to an embodiment for the apparatus of FIG. 3.

DETAILED DESCRIPTION OF EMBODIMENTS OF THE INVENTION

Figure 1:
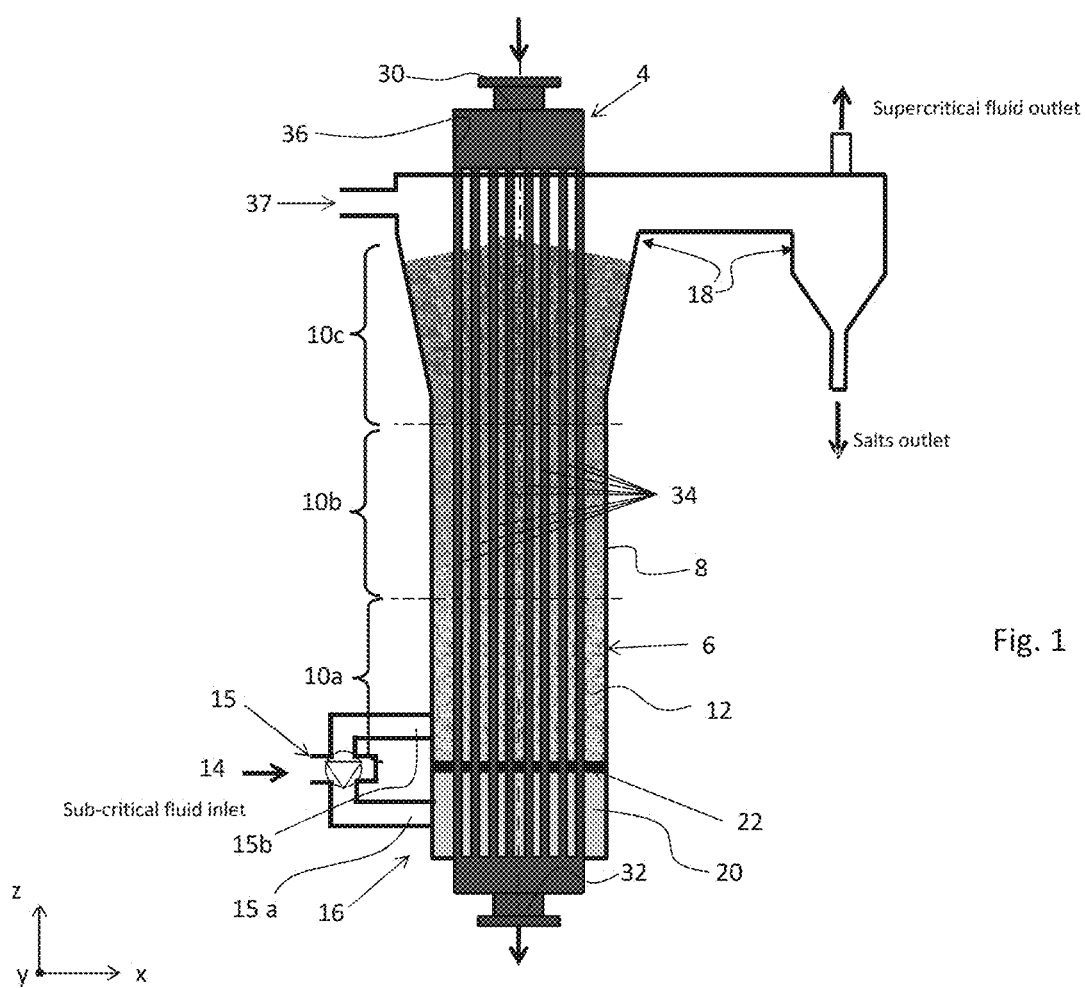
FIG. 1 is a schematic view of an apparatus for salt separation under supercritical water conditions according to a first embodiment of the invention.

Referring to the figures, an apparatus for salt separation from a water based liquid or liquefied substance under supercritical water conditions, comprises a heat exchanger 4 and a fluidized bed reactor 6.

The fluidized bed reactor 6 comprises one or more supercritical water pressure containing walls 8 enclosing therein a fluidized bed chamber 10 receiving therein a fluidized bed 12 and a water based liquid or liquefied substance for treatment 14. Depending on the treatment to be effected, for which the apparatus according to embodiments of this invention is employed, the liquid substance for treatment may be brine or sea water, industrial or domestic waste water, wet biomass such as water diluted manure or sewage sludges and other liquefied biomass. Regarding wet biomass, many forms of organic waste may be treated by an apparatus according to the invention, whereby the biomass may be ground and/or filtered and/or further diluted with water to produce a sufficiently liquid substance that can be injected into the fluidized bed reactor in a liquid stream. In an embodiment of the invention, the viscosity of liquefied substance should preferably be less than 100 cps (centipoise).

In case of solid particles bigger than orifices of the fluidization plate 22, a gravity or centrifugal separation device (not shown) can be added before or in the subcritical fluid inlet 15. In such case the inlet flow may be separated into two different flows: a high solid content flow and a low solid content flow. As illustrated in FIG. 1, the high solid content flow may be injected via a downstream inlet portion 15*b* connected to the reactor downstream of the fluidization plate and the low solid content flow injected via an upstream inlet portion 14*a* connected to the reactor upstream of the fluidization plate, to be used as a fluidizing flow.

The fluidized bed may comprise grains of solid material that have various compositions and sizes as a function of the treatment to be effected on the liquid substance. Fluidized bed grains can include the following materials with or without catalytic coating: natural sand, artificial sands, ceramics, glass spheres, metal spheres, pure catalyst.

Examples of treatment processes include biomass salt separation, gasification, methanation and desalination.

The fluidized bed reactor 6 further comprises an inlet system 16 through which the liquefied aqueous substance for treatment 14 is injected into the fluidized bed chamber or chambers 10, and an outlet system 18 for the extraction of precipitated salts and supercritical fluid. A pumping system (not shown) upstream of the inlet system 16 is configured to supply the liquefied aqueous substance for treatment 14 at a pressure in excess of the pressure necessary for supercritical water conditions, namely at a pressure greater than 22.1 MPa. A pre heating system upstream of the inlet system 16 is also provided in order to pre heat the liquefied aqueous substance for treatment 14 to a temperature above 300° centigrade, preferably above 350° centigrade but less that the temperature required for supercritical water conditions such that the liquefied substance enters the inlet system at subcritical water temperature conditions.

The inlet system 16 comprises an inlet chamber 20 separated from the fluidized bed chamber 10 or plurality of chambers (depending on the embodiment) by a fluidization plate 22. In an embodiment, the fluidization plate 22 comprises a plurality of fluidization orifices 23 configured to allow the liquefied aqueous substance for treatment 14 to pass therethrough but to hold the fluidized bed grains in the fluidized bed chamber. In this regard, it may be noted that the fluidization orifices 23 in the fluidization plate 22 do not necessarily need to have diameters smaller than the diameter of the grains of the fluidized bed and in certain variants the fluidization plate may on the contrary have orifices that are greater than the largest grain size in order to allow grains of the fluidization bed to be mixed with the liquefied aqueous substance for treatment injected through the inlet system 16. The loss of fluidized bed particles via the outlet may be compensated by injecting fluidized bed material in a compensatory quantity in the reactor, for instance via an inlet 37 of the fluidized bed reactor 6 separate from the inlet system 16 as illustrated in FIG. 1, and/or mixed into the liquefied aqueous substance for treatment 14 prior to the sub-critical fluid inlet 15. The plurality of orifices in the fluidization plate are configured to inject multiple jets of liquid into the fluidized bed chamber to create a turbulent flow mixing the fluidized bed and liquid within the chamber. The fluidization plate 22 may be in the form of a plate with a plurality of distributed fluidization orifices 23, or may comprise various nozzle inserts in various configurations that may per se be known in the art to direct the fluid injected into the fluidized bed chamber in a turbulent manner to obtain an optical mixing effect including a rubbing of the fluidized bed grains against internal surfaces in the chamber 10. The fluidization plate 22 as best seen in FIG. 4, further comprises orifices 35 for passage of the heat exchange elements 34 therethrough, according to the embodiment of FIG. 1.

In an embodiment, the fluidized bed chamber 10 is oriented in a vertical orientation, the flow of liquefied aqueous substance for treatment being directed from a bottom end towards a top end such that the fluidized bed grains remain within the chamber by gravitational force acting against the flow of the liquefied substance. The heat exchanger 4 is configured to heat the liquefied aqueous substance from a subcritical temperature to a supercritical temperature progressively from the fluidization plate 22 to the outlet system 18 whereby in a mid-portion 10*b* between the fluidization plate 22 and the outlet system 18, supercritical water conditions are attained. Preferably, the temperature of the liquefied substance at the fluidization plate 22 is subcritical and preferably an entry section 10 *a* representing at least 5% of the overall distance between the fluidization plate 22 and the outlet system 18 remains with below critical temperature such that the precipitation of salts due to supercritical conditions does not occur at the fluidization plate 22. In a mid-portion 10*b* of the fluidized bed chamber 10, supercritical conditions are attained and precipitation of salts, principally around the grains of the fluidized bed, occurs. In a section of the fluidized bed chamber between a mid-portion 10*a* and an outlet end portion 10*c*, the salt crystals formed on the fluidized bed grains are broken off the grains by the knocking of the grains in turbulent manner against each other and the wall surfaces of the chamber and/or heat exchanger walls such that the crystals break apart and are carried by the flow of supercritical fluid into the outlet system 18.

In an embodiment, the fluidized bed grains have a size and a density such that their surface to weight ratio is lower than the salt crystals that are formed and broken off such that the flow of supercritical aqueous substance carries the salt crystals out through the outlet system 18 but not the fluidized bed grains. In this regard, the flow rate of the supercritical fluid is configured to be sufficient to carry out the salt grains but not sufficient to carry the fluidized bed grains out of the outlet, the fluidized bed grains falling back by the force of gravity against the flow of supercritical fluid. A substantially continuous process can thus be achieved without recirculating fluidized bed grains. Nevertheless, in embodiments a small proportion of fluidized bed grains can be fed into the reactor with the liquefied substance to replace fluidized bed grains that may be carried out by the flow of supercritical fluid.

The outlet system 18 may comprise a separation system for separating supercritical fluid from solid particles, in particular the salt crystals, by means of a cyclone device or other such separating devices that are per se known in the art and that need not be described herein.

In order to ensure a well controlled temperature gradient within the fluidized bed chamber 10, a plurality of heat exchanger elements 34 are positioned in a distributed spaced apart manner within the fluidized bed chamber 10 to ensure on the one hand that in a mid-portion 10*b* of the chamber 10, the entire fluid is in a supercritical condition and at the same time within a portion adjacent the fluidization plate that the entire substance for treatment remains at a subcritical temperature.

Figure 2:
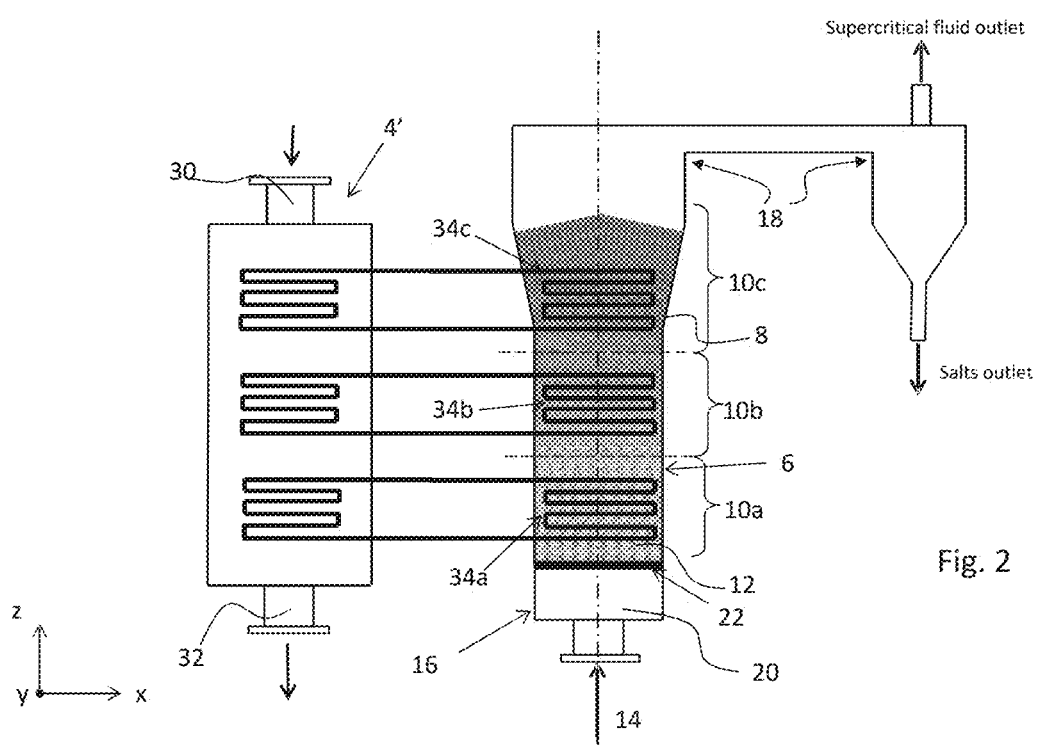
FIG. 2 is a schematic view of an apparatus for salt separation under supercritical water conditions according to a second embodiment of the invention.

In the embodiments of FIGS. 1 and 2, heat exchange elements are positioned within the fluidized bed chamber 10. Alternatively, as shown in the embodiment illustrated in FIGS. 3*a*, 3*b*, the heat exchanger comprises a heat exchange fluid surrounding and in direct contact with a plurality of supercritical water pressure containing walls 8 forming a plurality of fluidized bed chambers 10. In a preferred embodiment, the ratio of volume of heat exchange fluid per volume of supercritical fluid per unit length is preferably in the range of 20% to 150%, more preferably in the range of 20% to 80%.

Referring more particularly to the first embodiment illustrated in FIG. 1, the heat exchanger 4 comprises an inlet 30 at an outlet end of the fluidized bed chamber 10 and an outlet 32 at an inlet end of the fluidized bed chamber 10. In this embodiment, the heat exchanger comprises a plurality of elements 34 separated from each other and distributed in a spaced apart manner across the entire cross section of the fluidized bed chamber 10 such that heat exchange between the walls of the heat exchange elements and the aqueous substance to be treated in which the heat exchange elements are immersed, is optimally and efficiently performed. The heat exchanger 4 is fed with a fluid at a temperature greater than the critical temperature of water through the inlet 30. The inlet temperature and latent heat capacity of the heat exchange fluid is configured such that the amount of heat lost to the aqueous substance in the fluidized bed chamber cools the heat exchange liquid down to a subcritical temperature by the time it reaches the inlet system 16 of the fluidized bed reactor 6.

In the embodiment illustrated in FIG. 2, the heat exchanger 4 comprises a plurality of heat exchange elements 34*a*, 34*b*, 34*c*, at least a first heat exchange element 34*a* being positioned in an entry section 10*a* of the fluidized bed chamber 10, and at least a second heat exchange element 34*b* being positioned at least in a mid section 10*b* of the chamber 10. In a first variant, at least a third heat exchange element 34*c* is positioned in an outlet section 10*c* of the fluidized bed chamber 10 although in another variant it is also possible to have the second heat exchange element extending to the outlet section. The heat exchange elements positioned in the mid and outlet sections 10*b*, 10*c* of the fluidized bed chamber supply heat at above critical temperatures. The at least first heat exchange element 34*a* supplies heat at below critical temperatures for water based substances, at least in a lower portion thereof proximate the fluidization plate 22. In this configuration, the heat exchange elements may be coupled to an external heat exchanger 4' or a plurality of external heat exchangers configured to heat the individual elements 34a, 34b, 34c at the required subcritical, respectively supercritical temperatures.

Figure 3A:
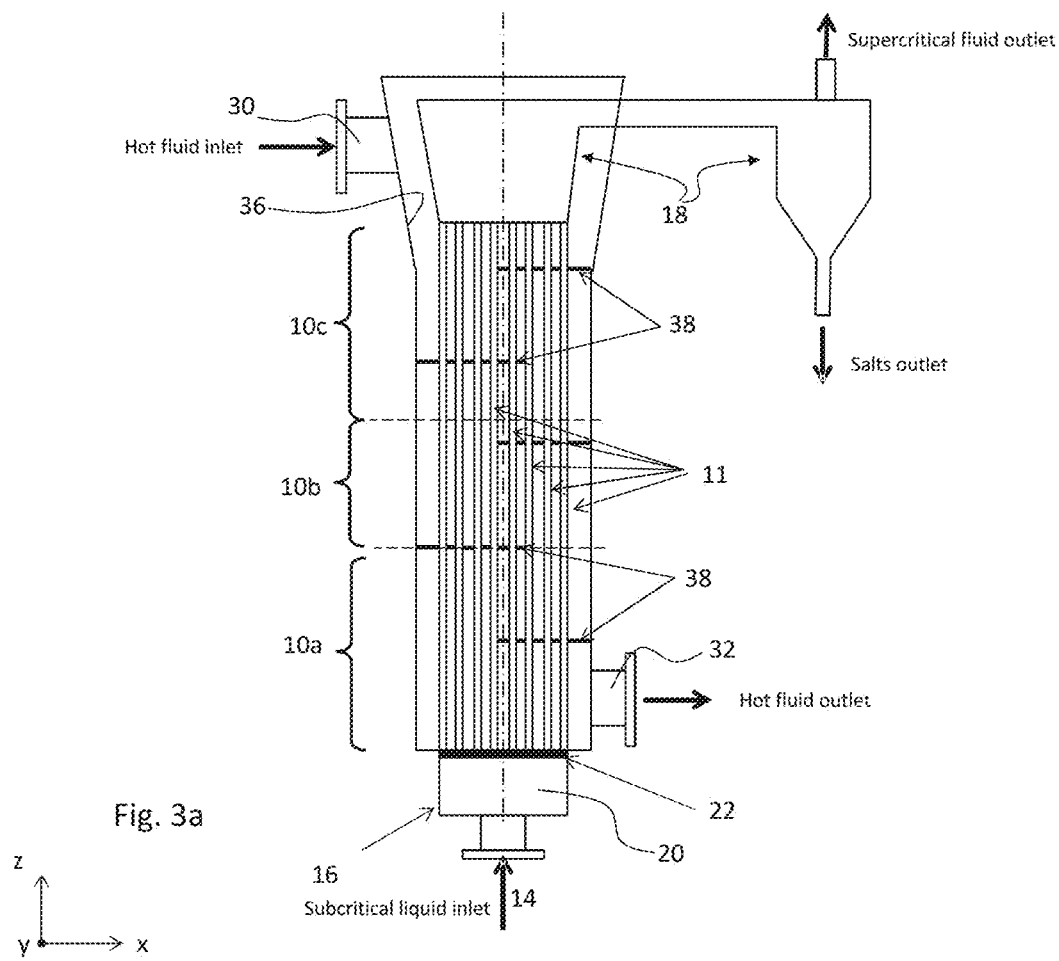
FIG. 3*a* is a schematic view of an apparatus for salt separation under supercritical water conditions according to a third embodiment of the invention.
Figure 3B:
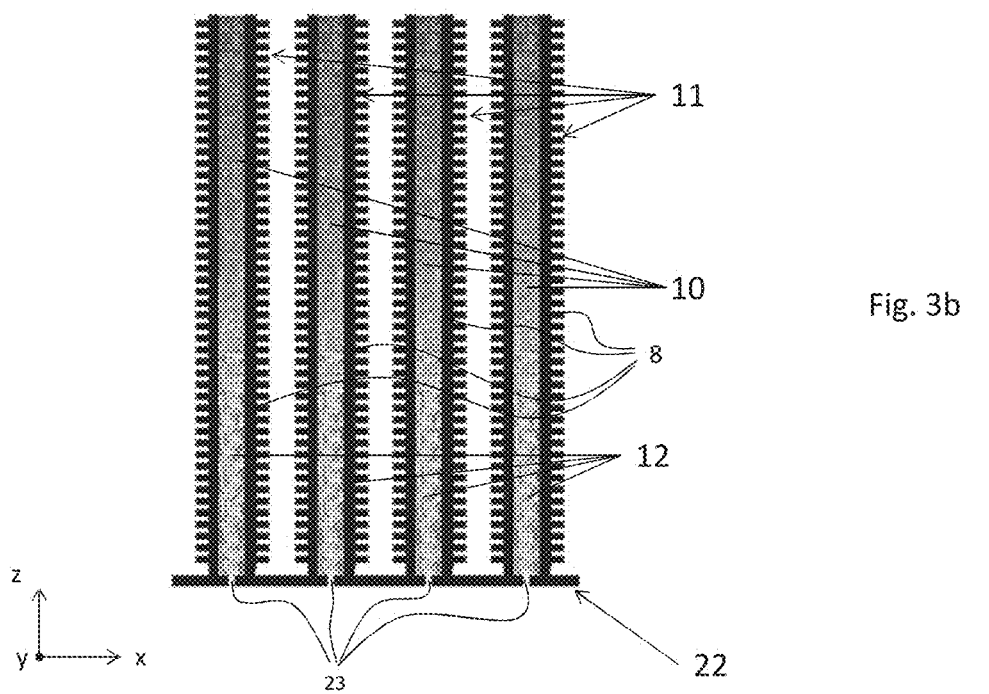
FIG. 3*b* is a schematic detail view of a portion of the apparatus according to FIG. 3*a*.

Referring now to FIGS. 3a and 3b, a third embodiment of the invention comprises a plurality of supercritical water pressure containing walls 8 forming a plurality of reactor elements 11 each containing a fluidized bed chamber 10 extending between the fluidization plate 22 and outlet system 18, the pressure containing walls 8 being immersed in a heat exchanger chamber 36. The heat exchanger chamber 36 can be provided with an inlet 30 positioned at the level of the outlet system 18 of the fluidized bed chambers, and an outlet 32 positioned essentially at a level of the inlet system 16 of the fluidized bed reactor. In this embodiment, the fluidization plate 22 comprises one or a plurality of orifices for each fluidized bed chamber 10. In order to improve the rate of heat exchange and the uniformity of heat exchange across the plurality of reactor elements 11 with fluidized bed chambers 10, the heat exchanger chamber 36 may be provided with one or more transverse baffles 38 ensuring a transverse flow of the heat exchange fluid across the reactor elements 11. The baffles may be configured to impart for instance a serpentine flow path to ensure that in the outlet and mid sections 10b, 10c, of the fluidized bed chambers 10, supercritical conditions are attained in a homogeneous manner, whereas in the entry section 10a temperatures remain subcritical.

In the embodiment of FIGS. 3a, 3b, an advantage of providing a plurality of individual fluidization chamber elements 11 is the ability to have a modular construction whereby the number of fluidization chamber elements is increased or decreased as a function of the volume per unit time of substance to be treated. An individual reaction chamber element may be optimized for a defined rate of flow of a fluid thus ensuring optimal efficiency in the salt separation process in each individual chamber without needing to adjust for varying unit sizes other than increasing or decreasing the number of fluidized bed chambers actively used. In a variant, in order to adapt for smaller flow rates in a configuration with a certain number of fluidized bed chamber elements, the fluidization plate may be exchangeable in order to reduce or increase the number of fluidization bed chambers through which the aqueous substance to be treated flows. Alternatively, valves provided on the fluidization plate or other means may be provided to close or open individual fluid bed chambers.

In addition to the precipitation of salts, the apparatus according to embodiments of this invention may also be useful gasification of organic matter present in the fluid to be treated simultaneously with the salt separation. The fluidizing medium may also comprise catalysts for instance to induce the conversion of the organic content of the fluid mixture into methane and hydrogen rich gases.

LIST OF REFERENCES IN THE DRAWINGS

Apparatus for salt separation 2
Heat exchanger 4
   Heat exchange elements 34
   Heat exchanger chamber 36
     Baffle 38
   Inlet 30
   Outlet 32
Fluidized bed reactor 6
   Supercritical water pressure containing wall 8
   Reactor elements 11
   Fluidized bed chamber(s) 10
     Entry section 10a
     Mid section 10b
     Outlet section 10c
   Outlet system 18
     Separation device
   Inlet system 16
     Inlet 15
        Inlet portion downstream (of fluidization plate) 15b
        Inlet portion upstream (of fluidization plate 15b
     Inlet chamber 20
     Fluidization plate 22
        Fluidization Orifices 23
        Orifices 35 for passage of heat exchange elements
   Fluidized bed 12
     Grains
Liquefied aqueous substance for treatment 14

The invention claimed is:

1. An apparatus for salt separation from an aqueous liquefied stream under supercritical water conditions, comprising:
a fluidized bed reactor including:
a fluidized bed chamber defined by a supercritical water pressure containing wall, and containing a fluidized bed therein;
an inlet system at one end of said fluidized bed reactor, said inlet system including an inlet in fluid communication with an inlet chamber and a fluidization plate positioned between the inlet chamber and the fluidized bed chamber;
an outlet system to separate solids from supercritical fluid at the other end of said fluidized bed reactor and spaced from the fluidized bed chamber;
wherein the fluidized bed chamber extends between the inlet system and outlet system and comprises an entry section adjacent the inlet system, an outlet section adjacent the outlet system, and a mid-section extending between the entry section and the outlet section; and
a heat exchanger extending through the fluidized bed chamber and comprising, in operation, a decreasing temperature gradient in the fluidized bed chamber from the outlet section to the inlet section, the temperature gradient in the outlet section and mid-section being supercritical for aqueous substances and being subcritical for aqueous substances in at least a first portion of the entry section adjacent the fluidization plate; and
wherein an aqueous liquefied stream is introduced into the inlet chamber, passes through said fluidization plate for treatment in the fluidized bed chamber, and solid particles in supercritical fluid exiting the fluidized bed chamber are removed by the outlet system.

2. An apparatus according to claim 1, wherein the heat exchanger comprises a plurality of heat exchanger elements positioned within the fluidized bed chamber in a distributed manner, the heat exchanger elements receiving a heat exchange fluid therein and are connected to a heat exchange fluid inlet positioned at a level of the outlet system of the fluidized bed reactor, the heat exchange system comprising a heat exchange fluid outlet at a level of the inlet system of the fluidized bed reactor.

3. Apparatus according to claim 2, wherein the heat exchange elements comprise a plurality of tubular elements arranged in a spaced apart and distributed manner and extend from the heat exchange fluid inlet to the heat exchange fluid outlet.

4. Apparatus according to claim 1, wherein the heat exchanger comprises at least first and second heat exchange elements, the first heat exchange element being positioned in the entry section of the fluidized bed chamber to heat the liquefied aqueous substance in the fluidized bed chamber at a temperature that remains subcritical adjacent the fluidization plate, and the at least second heating element positioned in at least the mid-section to heat the liquefied aqueous substance at a supercritical temperature.

5. Apparatus according to claim 4, comprising a heating element in at least the outlet section of the fluidized bed chamber for maintaining the aqueous substance at a supercritical temperature.

6. Apparatus according to claim 1, wherein the fluidized bed reactor comprises a plurality of reactor elements each containing a fluidized bed chamber enclosed by a supercritical water pressure containing wall, the plurality of reactor elements with fluidized bed chambers being arranged in a distributed spaced apart manner and immersed in a heat exchanger chamber to receive a heat exchange fluid therein.

7. Apparatus according to claim 6, wherein the heat exchange chamber comprises a heat exchange fluid inlet positioned at a level of the outlet system of the fluidized bed reactor, and a heat exchange fluid outlet at a level of the inlet system of the fluidized bed reactor.

8. Apparatus according to claim 6, wherein the heat exchange chamber comprises one or more baffles to impart transverse flow to the heat exchange fluid across the plurality of fluidized bed chamber elements.

9. Apparatus according to claim 1, wherein the fluidized bed reactor is arranged such that inlet system is vertically lower than the outlet system such that gravitational force on grains of the fluidized bed pull the grains towards the fluidization plate against the flow of fluid in the fluidized bed chamber.

* * * * *